US012304787B2

(12) United States Patent
Bangalore Srinivas et al.

(10) Patent No.: US 12,304,787 B2
(45) Date of Patent: May 20, 2025

(54) CHASSIS WITH AN INTEGRATED FORK ASSEMBLY FOR AUTONOMOUS MOBILE ROBOTS AND AUTONOMOUS GUIDED VEHICLES

(71) Applicant: Tata Consultancy Services Limited, Mumbai (IN)

(72) Inventors: Venkatesh Prasad Bangalore Srinivas, Bangalore (IN); Pradeep Prabhakar Kamble, Bangalore (IN)

(73) Assignee: Tata Consultancy Services Limited, Mumbai (IN)

(*) Notice: Subject to any disclaimer, the term of this patent is extended or adjusted under 35 U.S.C. 154(b) by 493 days.

(21) Appl. No.: 17/892,690

(22) Filed: Aug. 22, 2022

(65) Prior Publication Data

US 2023/0399212 A1 Dec. 14, 2023

(30) Foreign Application Priority Data

Jun. 13, 2022 (IN) ............................ 202221033813

(51) Int. Cl.

| | |
|---|---|
| ***B66F 9/075*** | (2006.01) |
| ***B66F 7/14*** | (2006.01) |
| ***B66F 9/06*** | (2006.01) |

(52) U.S. Cl.
CPC ............ *B66F 9/07513* (2013.01); *B66F 7/14* (2013.01); *B66F 9/063* (2013.01)

(58) Field of Classification Search
CPC ................. B66F 2700/126; B66F 3/16; B66F 5/02–025; B66F 7/10–14; B66F 9/063; B66F 9/075; B66F 9/0513; B66F 9/12–165; B66F 9/19; B62B 3/06; B62B 3/0606; B62B 3/0612; B62B 3/0625; B62B 2203/10
See application file for complete search history.

(56) References Cited

U.S. PATENT DOCUMENTS

| | | | | |
|---|---|---|---|---|
| 4,741,412 A * | 5/1988 | Sable | ..................... | B66F 9/063 187/244 |
| 2012/0012425 A1 | 1/2012 | Hayase et al. | | |

FOREIGN PATENT DOCUMENTS

| | | |
|---|---|---|
| CN | 110357005 A | 10/2019 |
| CN | 111377378 A | 7/2020 |

* cited by examiner

*Primary Examiner* — Tyrone V Hall, Jr.
(74) *Attorney, Agent, or Firm* — Finnegan, Henderson, Farabow, Garrett & Dunner, LLP

(57) ABSTRACT

A compact and mast-less apparatus for an autonomous mobile robots (AMRs) or autonomous guided vehicle (AGVs). The apparatus includes a chassis having a fork assembly with a first plate and second plate, wherein the first plate is provided with a first and second set of bushings mounted thereon, a first and second set of guide rods configured to slide within the bushings and provided with linear bearings, a bearing retainer mounted on the first plate, a ball and bevel gear assembly coupled to the bearing retainer, a hinge clamp mounted on an end of a ball screw nut of the ball and bevel gear assembly, a fork motor operatively coupled to the ball screw and bevel gear assembly and wherein the second plate is provided with mounting holes for mounting the guide rods and hinge clamp.

12 Claims, 14 Drawing Sheets

CHASSIS WITH AN INTEGRATED FORK ASSEMBLY FOR AUTONOMOUS MOBILE ROBOTS AND AUTONOMOUS GUIDED VEHICLES

PRIORITY CLAIM

This U.S. patent application claims priority under 35 U.S.C. § 119 to: Indian Patent Application No. 202221033813, filed on Jun. 13, 2022. The entire contents of the aforementioned application are incorporated herein by reference.

TECHNICAL FIELD

The disclosure herein generally relates to chassis and fork assemblies, and, more particularly, to a chassis with an integrated fork assembly for autonomous mobile robots and autonomous guided vehicles.

BACKGROUND

Traditionally, forklift types have been made available in the market for automated guided vehicles (AGVs) and autonomous mobile robots (AMRs). Application of these robots are huge in logistic warehouses and smart factories postal industries across the world. All factories/manufacturing units are leading to adoption of AGVs and AMRs to act as smart factory and to achieve increased safety, reduction in infrastructure cost, and improved production time.

It is therefore imperative for logistics manufacturing units/organizations to demand for compact and multi-purpose forklift AMRs for optimally utilize their environment space and to achieve speedy handling of both stringer and non-stringer pallet types. Typical available vehicles such as fork type autonomous mobile robots (AMRs) are suitable to handle pallets and are typically designed with two forks. Such AMRs are very bulky and designed for a cart handling application, and usually have large openings. These traditional AMRs also have a mast unit to enable lifting of payload, owing to higher cost.

SUMMARY

Embodiments of the present disclosure present technological improvements as solutions to one or more of the above-mentioned technical problems recognized by the inventors in conventional systems.

For example, in one aspect, there is provided an apparatus for Autonomous Mobile Robots (AMRs) and Autonomous Guided Vehicles (AGVs). The apparatus comprises a chassis comprising a front end and a rear end, wherein the rear end of the chassis assembly serves as a fork assembly, wherein the fork assembly comprises a first end and a second end. The fork assembly comprises a first plate comprising a first side wall and a second side wall, wherein each of the first side wall and the second side wall extends from the first end through the second end of the fork assembly; a first set of bushings and a second set of bushings, wherein each bushing from the first set of bushings and the second set of bushings comprises a circular end and a flange end, wherein the flange end of each bushing from the first set of bushings and the second set of bushings comprises a plurality of holes, and wherein the first set of bushings and the second set of bushings are mounted adjacent to the first side wall and the second side wall respectively on the first plate of the fork assembly by a plurality of screws that are fitted into the plurality of holes of the flange end; a first set of guide rods and a second set of guide rods, each guide rod from the first set of guide rods and the second set of guide rods is configured to slide through the circular end and a corresponding linear bearing comprised in a corresponding bushing from the first set of bushings and the second set of bushings; a bearing retainer mounted on the first plate; a ball screw and bevel gear assembly coupled to the bearing retainer using one or more bearings, wherein the ball screw and bevel gear assembly comprises a ball screw and a bevel gear arrangement; a ball screw nut assembled on the ball screw and bevel gear assembly, wherein a first end of the ball screw nut comprises a step to form a plurality of threads, and a second end of the ball screw nut comprises a set of holes; a hinge clamp mounted on the second end of the ball screw nut via the set of holes using a plurality of pins; a fork motor fitted in the first plate, wherein the fork motor is operatively coupled to the ball screw and bevel gear assembly; and a second plate mounted on the first plate, wherein the second plate comprises a plurality of hinge mounting holes and a plurality of guide rod mounting holes, wherein the second plate is fixed to the hinge clamp and the first set of guide rods and the second set of guide rods using a plurality of screw mechanisms through the plurality of hinge mounting holes and the plurality of guide rod mounting holes respectively.

In an embodiment, each of the first plate and the second plate comprises a tapered guide plate that extends from the second end.

In an embodiment, the bevel gear arrangement comprises a drive bevel gear and a driven bevel gear, and wherein the drive bevel gear and the driven bevel gear are operatively coupled to each other.

In an embodiment, the fork motor comprises a first end and a second end. The first end of the motor is configured to receive power supply, and the second end of the fork motor is connected to the drive bevel gear of the bevel gear arrangement.

In an embodiment, the fork motor is configured to rotate the drive bevel gear in a first direction that in turn rotates the driven bevel gear, wherein rotation of the driven bevel gear drives the ball screw nut and the ball screw in a second direction, and wherein driving of the ball screw nut and ball screw in the second direction causes movement of the second plate in the second direction.

In an embodiment, the fork motor is further configured to rotate the drive bevel gear in a third direction that in turn rotates the driven bevel gear, wherein rotation of the driven bevel gear drives the ball screw nut and the ball screw in a fourth direction, and wherein driving of the ball screw nut and ball screw in the fourth direction causes the movement of the second plate in the fourth direction.

In an embodiment, the apparatus further comprises a lip seal mounted on a top surface of (i) the first side wall, and (ii) the second side wall, (iii) a third side wall, and (iv) a fourth side wall of the first plate. The lip seal is configured to (i) refrain entry and accumulation of dust inside the first plate and the second plate, and (ii) enable the movement of the second plate with reference to the first plate.

In an embodiment, the first direction and the second direction are a clockwise direction and an upward direction respectively.

In an embodiment, the third direction and the fourth direction are an anti-clockwise direction and a downward direction respectively.

In an embodiment, the first set of bushings, the second set of bushings, the first set of guide rods and the second set of guide rods are configured to counter at least one of imbalance and deflection of the second plate during at least one of (i) placement of a payload on the second plate, and (ii) transport of the payload from one location to another location.

In an embodiment, the bearing retainer and the ball screw and bevel gear assembly are placed and mounted at a center of a region formed by the first side wall, the second side wall, the third side wall, and the fourth side wall of the first plate between the first plate and the second plate such that the bearing retainer and the ball screw and bevel gear assembly are equidistant from the first end and the second end of the fork assembly.

In an embodiment, each bushing from the first set of bushings and the second set of bushings is mounted at a specific position on the first plate such that each bushing and an adjacent bushing are separated by a pre-defined distance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
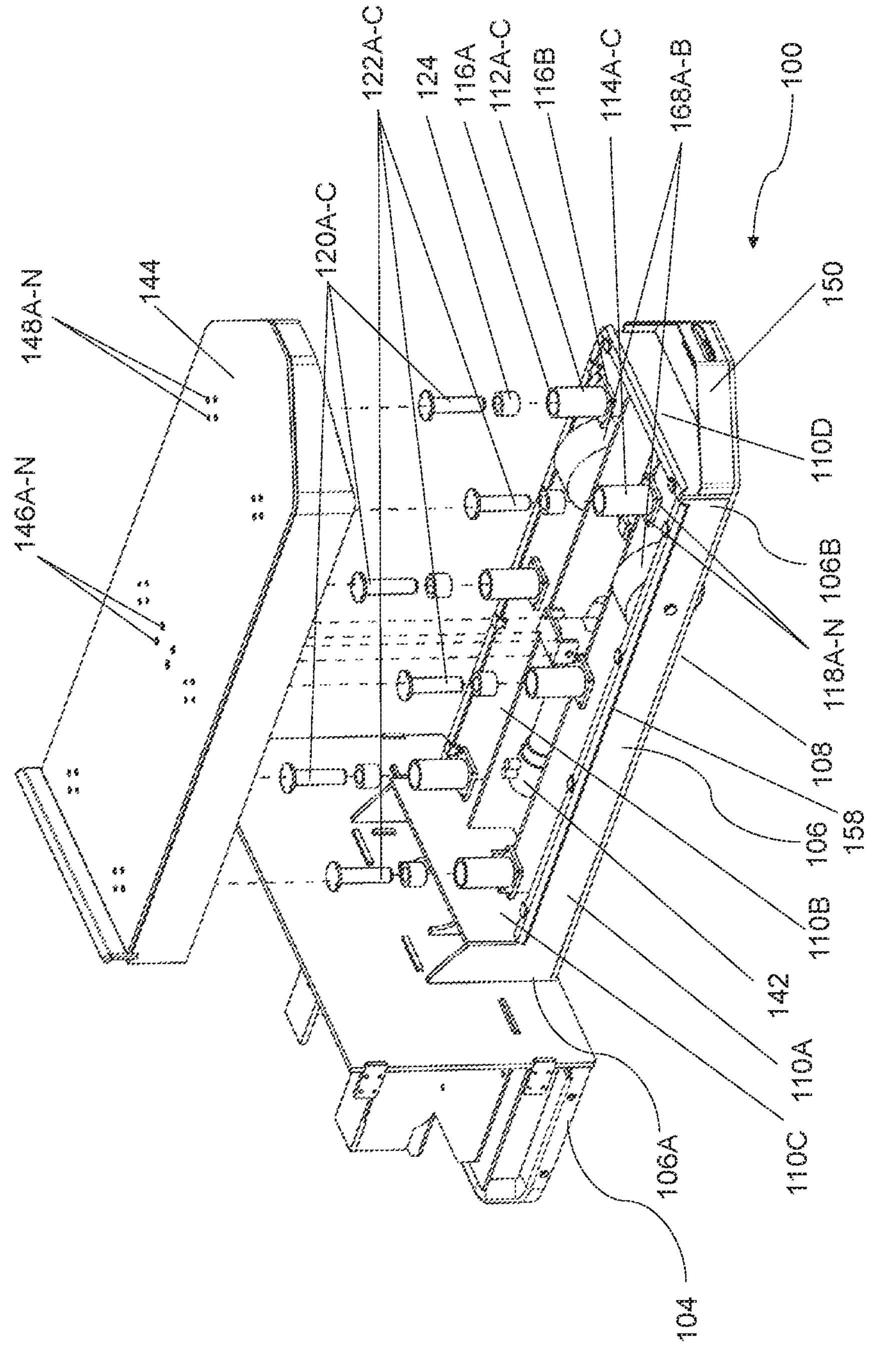
FIG. 1A illustrate an apparatus for Autonomous Mobile Robots (AMRs) and Autonomous Guided Vehicles (AGVs), in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Traditionally, forklift types have been made available in the market for automated guided vehicles (AGVs) and autonomous mobile robots (AMRs). Application of these robots are huge in logistic warehouses and smart factories postal industries across the world. All factories/manufacturing units are leading to adoption of AGVs and AMRs to act as smart factory and to achieve increased safety, reduction in infrastructure cost, and improved production time.

It is therefore imperative for logistics manufacturing units/organizations to demand for compact and multi-purpose forklift AMRs for optimally utilize their environment space and to achieve speedy handling of both stringer and non-stringer pallet types. Typical available vehicles such as fork type autonomous mobile robots (AMRs) are suitable to handle pallets and are typically designed with two forks. Such AMRs are very bulky and designed for a cart handling application, and usually have large openings. These traditional AMRs also have a mast unit to enable lifting of payload, owing to higher cost. There may be single fork based AMRs, but these do not have mechanisms to lift top plate of the fork assembly and are not capable of countering imbalance and deflection caused during payload placement on the fork assembly and movement thereof from one location to another location.

Embodiments of the present disclosure provides chassis with integrated single fork assembly for AMRs/AGVs specifically used for transporting roller cages or carts within the warehouses. The chassis with integrated single fork assembly enables performing tasks given by end users. The chassis carries the steer and traction wheel and additional swivel wheels to increase the stability of the autonomous mobile robot wherein fork mechanism includes the follower wheels and lifting mechanism. Such design and mechanism of the chassis with integrated single fork assembly overcomes the limitations of smaller widths between wheels of roller cage or carts at the bottom side for placement and movement of payload within warehouses and logistics environments. The chassis with integrated single fork assembly comprises bushings, guide rods, which are fixed to bottom and top plates (first and second plate) of the single fork assembly using a hinge clamp via a plurality of hinge mounting holes and a plurality of guide rod mounting holes. The bushings and guide rods counter imbalance and deflection of the second plate during (i) placement of a payload on the second plate, and/or (ii) transport of the payload from one location to another location.

Referring now to the drawings, and more particularly to FIGS. 1A through 8D, where similar reference characters denote corresponding features consistently throughout the figures, there are shown preferred embodiments and these embodiments are described in the context of the following exemplary system and/or method.

Reference numerals of one or more components of the chassis with an integrated fork assembly as depicted in the FIGS. 1A through 8D are provided in Table 1 below for ease of description:

TABLE 1

| SI. No | Component | Numeral reference |
|---|---|---|
| 1 | Apparatus | 100 |
| 2 | Chassis | 102 |
| 3 | Front end of the chassis | 104 |
| 4 | Rear end of the chassis/fork assembly | 106 |
| 5 | First end of the fork assembly | 106A |
| 6 | Second end of the fork assembly | 106B |
| 7 | First plate/Bottom plate | 108 |
| 8 | First side wall of the first plate | 110A |
| 9 | Second side wall of the first plate | 110B |
| 10 | Third side wall of the first plate | 110C |
| 11 | Fourth side wall of the first plate | 110D |
| 12 | A first set of bushings | 112A-C |
| 13 | A second set of bushings | 114A-C |
| 14 | Circular end of a bushing | 116A |
| 15 | Flange end of the bushing | 116B |
| 16 | A plurality of holes comprised in flange end | 118A-N |
| 17 | A first set of guide rods | 120A-C |
| 18 | A second set of guide rods | 122A-C |
| 19 | Linear bearing | 124 |
| 20 | Bearing retainer | 126 |
| 21 | One or more bearings | 126A |
| 22 | Ball screw and bevel gear assembly | 128 |
| 23 | Ball screw | 128A |
| 24 | Bevel gear arrangement | 128B |
| 25 | Ball screw nut | 130 |
| 26 | First end of the ball screw nut | 132A |
| 27 | Second end of the ball screw nut | 132B |
| 27 | Step of the first end of the ball screw nut | 134 |
| 28 | Set of holes on the second end of the ball screw nut | 136A-N |
| 29 | Hinge clamp | 138 |
| 30 | A plurality of pins | 140A-N |
| 31 | Fork motor | 142 |
| 32 | Second plate/Top plate | 144 |
| 33 | A plurality of hinge mounting holes | 146A-N |
| 34 | A plurality of guide rod mounting holes | 148A-N |
| 35 | Tapered guide plate | 150 |
| 36 | Drive bevel gear | 152 |
| 37 | Driven bevel gear | 154 |
| 38 | First end of the fork motor | 156A |
| 39 | Second end of the fork motor | 156B |
| 40 | Lip seal | 158 |
| 41 | One or more center ribs | 160A-B |
| 42 | A plurality of mount flanges | 162A-B |
| 43 | Steer and drive wheel mount bracket | 164 |
| 44 | Long Pin | 166 |
| 45 | One or more wheel mount brackets | 168A-B |
| 46 | Battery mounting plate | 170 |
| 47 | Mounting block | 172 |
| 48 | Spacers | 174A-B |
| 49 | One of more fork wheels | 176A-B |
| 50 | One or more swivel wheels | 178A-B |
| 51 | One or more steer and drive wheels | 180 |

TABLE 1-continued

| SI. No | Component | Numeral reference |
|---|---|---|
| 52 | One or more chassis gussets | 182A-B |
| 53 | Front panel | 184 |
| 54 | Display | 186 |
| 55 | Emergency button | 188 |
| 56 | Light indicator | 190 |
| 57 | One or more image/video capturing devices | 192 |
| 58 | Ultrasonic sensors | 194A-N |
| 59 | LIDAR sensor | 196 |

Figure 1B:
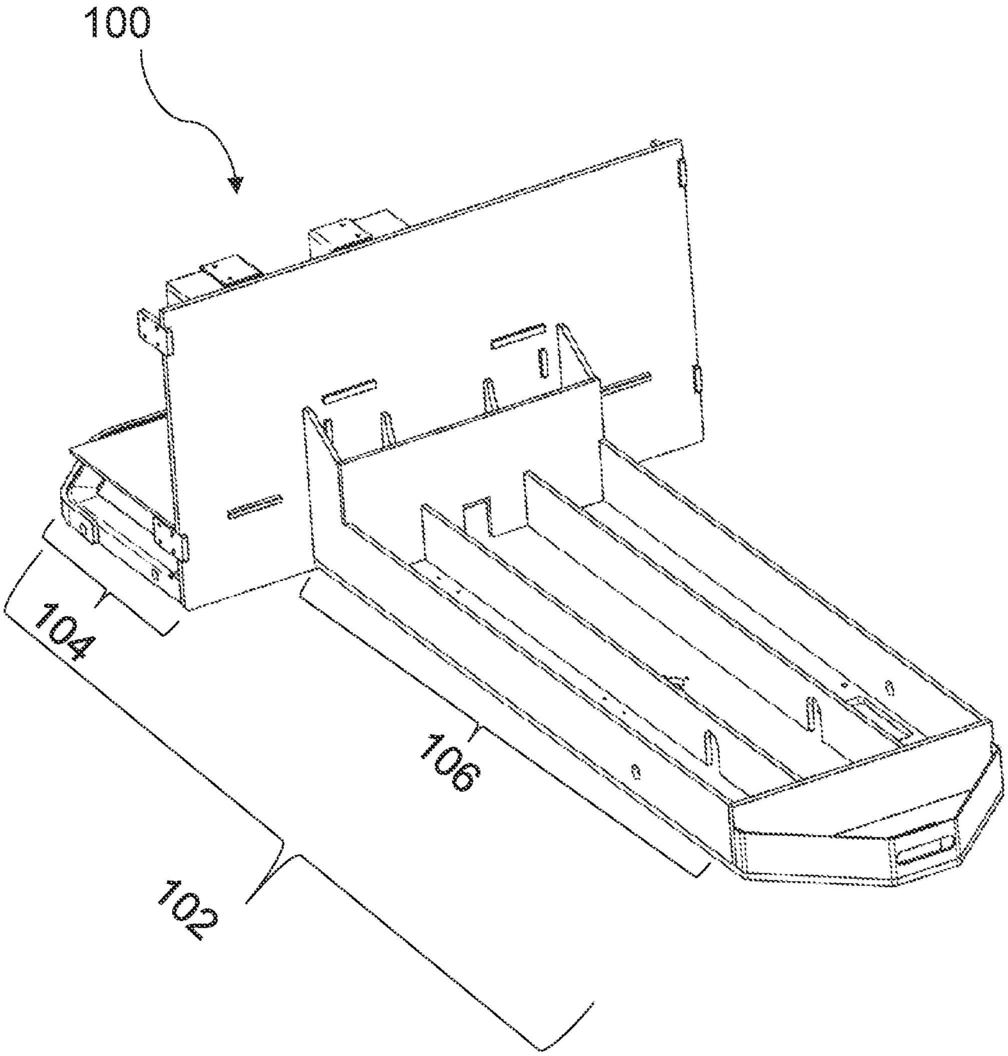
FIG. 1B illustrates a front perspective view of the apparatus for the Autonomous Mobile Robots (AMRs) and Autonomous Guided Vehicles (AGVs), in accordance with an embodiment of the present disclosure.
Figure 1C:
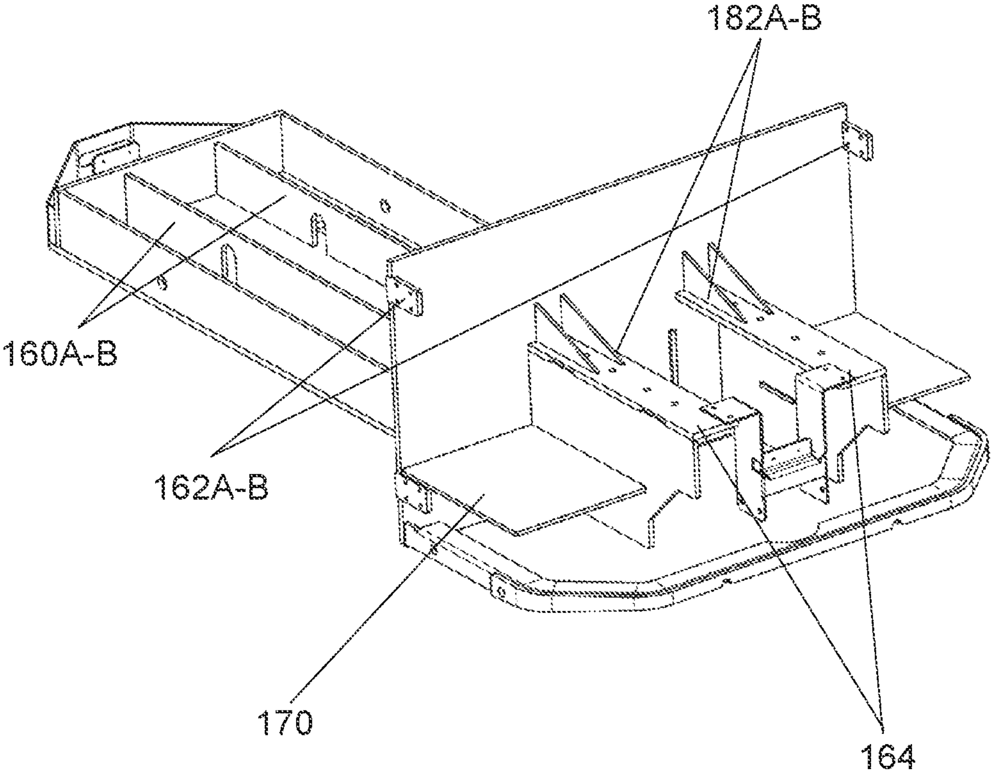
FIG. 1C illustrates a rear perspective view of the apparatus for the Autonomous Mobile Robots (AMRs) and Autonomous Guided Vehicles (AGVs), in accordance with an embodiment of the present disclosure.

FIG. 1A illustrate an apparatus 100 for Autonomous Mobile Robots (AMRs) and Autonomous Guided Vehicles (AGVs), in accordance with an embodiment of the present disclosure. FIG. 1B, with reference to FIG. 1A, illustrates a front perspective view of the apparatus 100 for the Autonomous Mobile Robots (AMRs) and Autonomous Guided Vehicles (AGVs), in accordance with an embodiment of the present disclosure. FIG. 1C, with reference to FIGS. 1A-1B, illustrates a rear perspective view of the apparatus 100 for the Autonomous Mobile Robots (AMRs) and Autonomous Guided Vehicles (AGVs), in accordance with an embodiment of the present disclosure. The apparatus 100 may be referred as "chassis with an integrated fork assembly" and is interchangeably used herein after. More specifically, FIG. 1A illustrates a perspective view of the apparatus 100 for Autonomous Mobile Robots (AMRs) and Autonomous Guided Vehicles (AGVs), in accordance with an embodiment of the present disclosure. The apparatus 100 will not be explained in conjunction with FIGS. 1A through 1C. The apparatus 100 comprises a chassis 102. The chassis 102 comprises a front end 104 and a rear end 106. The front end 104 and the rear end 106 may also be referred as a first end and a second end respectively and interchangeably used herein after. The rear end 106 of the chassis 102 serves as a fork assembly 106. In other words, the rear end of the chassis is referred as fork assembly 106. Construction of the chassis 102 is such that the structure with both the front end 104 and the rear end 106 construes a single piece component. The fork assembly 106 comprises a first end 106A, a second end 1068, and a first plate 108. The first plate 108 is also referred as a bottom plate and may be interchangeably used herein. The first plate 108 (bottom plate) comprises a first side wall 110A, a second side wall 1106, a third side wall 110C, and a fourth side wall 110D. The fork assembly 106 further comprises a first set of bushings 112A-C and a second set of bushings 114A-C. The first set of bushings 112A-C and the second set of bushings 114A-C may also be referred as 'bushings', or 'bushing' and interchangeably used herein. As depicted in FIG. 1, the first set of bushings 112A-C are mounted on the first plate (or bottom plate) 108 and are adjacent to the first side wall 110A. Similarly, the second set of bushings 112A-C are mounted on the first plate (or bottom plate) 108 and are adjacent to the second side wall 1108. In the apparatus 100, the first side wall 110A and the second side wall 1108 of the first plate 108 are structurally positioned opposite (or facing) to each other. Similarly, the third side wall 110C and the fourth side wall 110D of the first plate 108 are structurally positioned opposite (or facing) to each other. It is to be understood by a person having ordinary skill in the art or person skilled in the art that length and width of the side walls (e.g., the first side wall 110A, the second side wall 1108, the third side wall 110C and the fourth side wall 110D may vary based on design specification/requirement of the apparatus 100. Each of the first side wall 110A and the second side wall 1108 extends from the first end 106A through the second end 1068 of the fork assembly 106.

The fork assembly 106 further comprises a first set of bushings 112A-C and a second set of bushings 114A-C. Each bushing from the first set of bushings 112A-C and the second set of bushings 114A-C comprises a circular end 116A and a flange end 1168. The flange end 1168 of each bushing from the first set of bushings 112A-C and the second set of bushings 114A-C comprises a plurality of holes 118A-N. The first set of bushings 112A-C and the second set of bushings 114A-C are mounted adjacent to the first side wall 110A and the second side wall 1108 respectively on the first plate 108 of the fork assembly 106 by a plurality of screws that are fitted into the plurality of holes 118A-N of the flange end 1168. Each bushing from the first set of bushings 112A-C and the second set of bushings 114A-C is mounted at a specific position on the first plate 108 such that each bushing and an adjacent bushing are separated by a pre-defined distance. For instance, as depicted in FIG. 1, consider the first set of bushings 112A-C which are mounted adjacent to the first side wall 110A. As can be seen the bushing 112A and bushing 1128 from the first set of bushings 112A-C are fixed to the first plate 108 and are separated by a distance, 'x' (e.g., value of 'x' may be in mm/cm and the like and may vary depending on the structural/design requirements of the apparatus 100). Similarly, the bushing 112B is separated by the distance 'x' with reference to the bushing 112C. The second set of bushings 114A-C are also fixed and arranged on the first plate 108 in a similar fashion/manner. It is to be noted that the bushings 112A and 114A are also arranged and fixed on the first plate 108 alongside of the first side wall 110A and the second side wall 1108 and are separated by a distance, say 'y' (e.g., value of 'y' may be in mm/cm and the like and may vary depending on the structural/design requirements of the apparatus 100). It is to be understood by a person having ordinary skill in the art or person skilled in the art that the number of bushings required to be fixed on the first plate 108 as is the case in the present disclosure and the apparatus 100 shall not be construed as limiting the scope of the present disclosure. In other words, the number of bushings and their corresponding fixing position may be vary depending upon the structural and design requirements of the apparatus 100.

The fork assembly 106 further comprises a first set of guide rods 120A-C and a second set of guide rods 122A-C. Each guide rod from the first set of guide rods 120A-C and the second set of guide rods 120A-C is configured to slide through the circular end 116A and a corresponding linear bearing 124 comprised in a corresponding bushing from the first set of bushings 120A-C and the second set of bushings 122A-C. For instance, as depicted in FIG. 1A, the guide rod 120A is configured to slide through the circular end 116A and the corresponding linear bearing 124 that is fitted in the bushing 122A. Similarly, other guide rods (120B-C and 122A-C) slide through the respective circular ends of corresponding/associated bushings and the linear bearings respectively.

Figure 2:
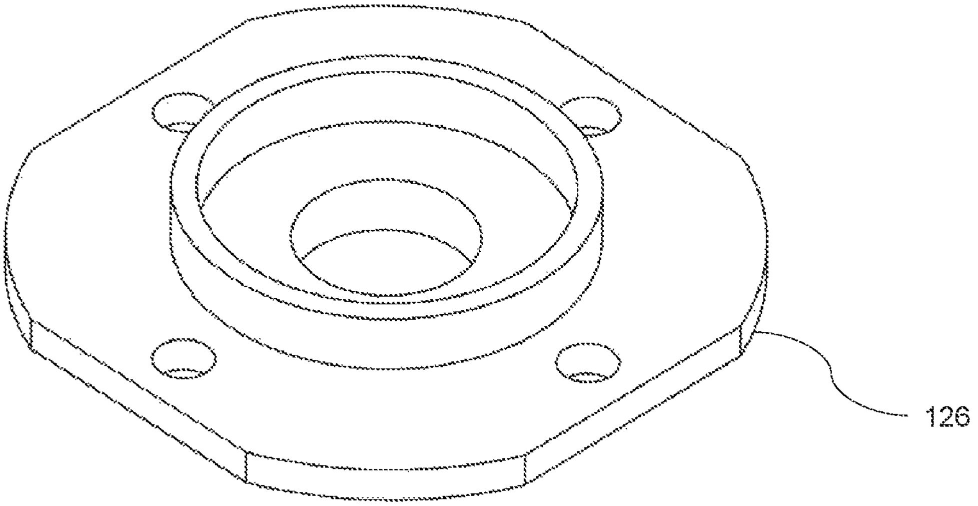
FIG. 2 depicts a bearing retainer comprised in the apparatus, in accordance with an embodiment of the present disclosure.

The fork assembly 106 further comprises a bearing retainer 126 mounted on the first plate 108. The fork assembly 106 further comprises a ball screw and bevel gear assembly 128 coupled to the bearing retainer 126 using one or more bearings 126A. The ball screw and bevel gear assembly 128 may also be coupled to the bearing retainer 126 using the bearing 126A and a circlip (not shown in FIGS.) FIG. 2, with reference to FIGS. 1A through 1C, depicts the bearing retainer 126 comprised in the apparatus 100, in accordance with an embodiment of the present disclosure. As depicted in FIG. 2, a plurality of bearing retainer mounting holes are present on the top surface of the bearing retainer 126. The plurality of bearing retainer mounting holes are configured to couple the top plate and hold it firmly by way of screw mechanisms via the plurality of hinge mounting holes 146A-N. The bearing retainer 126 and the ball screw and bevel gear assembly 128 are placed and mounted at a center of a region formed by the first side wall 110A, the second side wall 1106, the third side wall 110C, and the fourth side wall 110D of the first plate 108 between the first plate 108 and the second plate 144 such that the bearing retainer 126 and the ball screw and bevel gear assembly 128 are equidistant from the first end 106A and the second end 106B of the fork assembly. For instance, size and shape of the first plate 106 and the second plate 144 is such that the inner space formed by the first side wall 110A, the second side wall 1106, the third side wall 110C, and the fourth side wall 110D is of a rectangular shape as depicted in FIGS. Center is identified from the space formed due to rectangular shape. Rectangular shape formation by the first side wall 110A, the second side wall 1108, the third side wall 110C, and the fourth side wall 110D shall not be construed as limiting the scope of the present disclosure. Such shape formation may vary depending upon the design and structural components of the apparatus 100.

The ball screw and bevel gear assembly 128 comprises a ball screw 128A and a bevel gear arrangement 128B. The bevel gear arrangement 128B comprises a drive bevel gear 152 and a driven bevel gear 154. The drive bevel gear 152 and the driven bevel gear 154 are operatively coupled to each other. In other words, the drive bevel gear 152 and the driven bevel gear 154 are connected to each other for operating the apparatus 100 (described in later section).

Figure 3A:
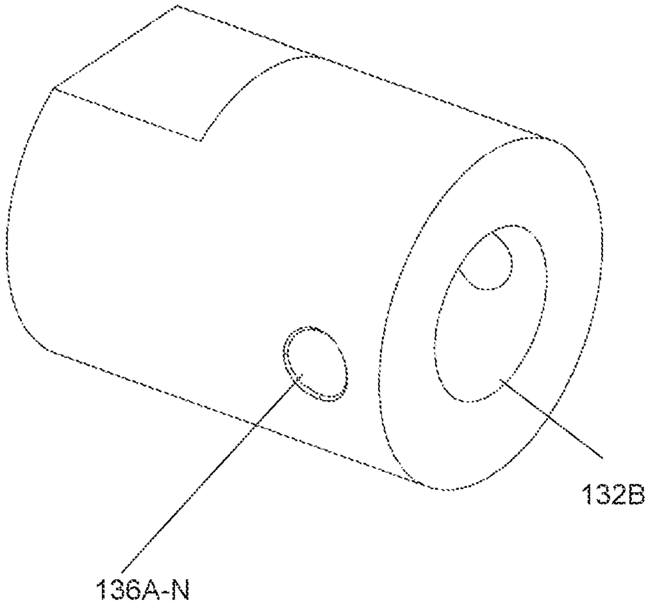
FIGS. 3A and 3B depict a perspective view of a ball screw nut comprising a step to form a plurality of threads and a set of holes, in accordance with an embodiment of the present disclosure.
Figure 3B:
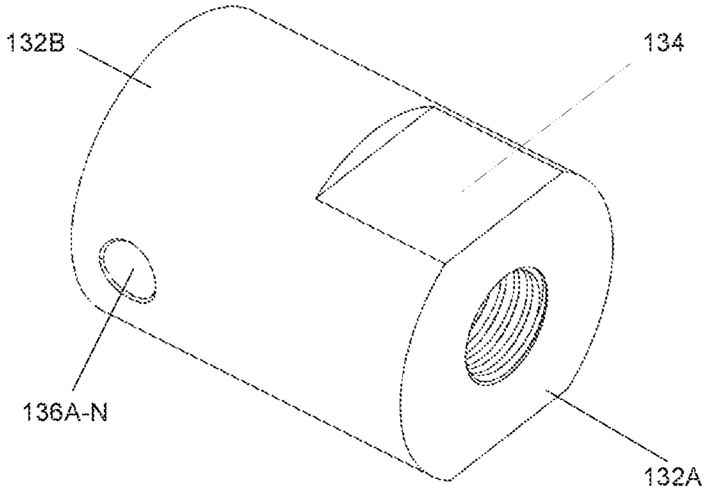
Figure 4A:
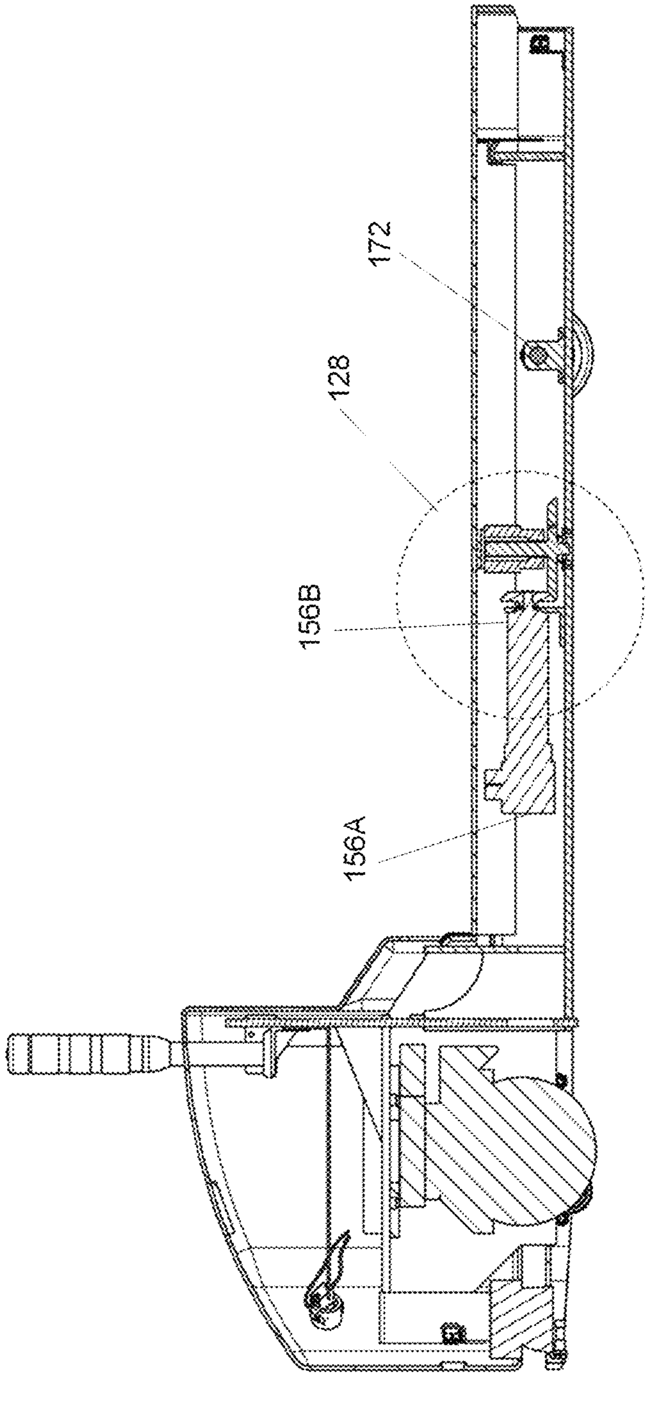
FIG. 4A depicts a detailed sectional view of a ball screw and bevel gear assembly comprised in a fork assembly of the apparatus for AMRs/AGVs, in accordance with an embodiment of the present disclosure.
Figure 4B:
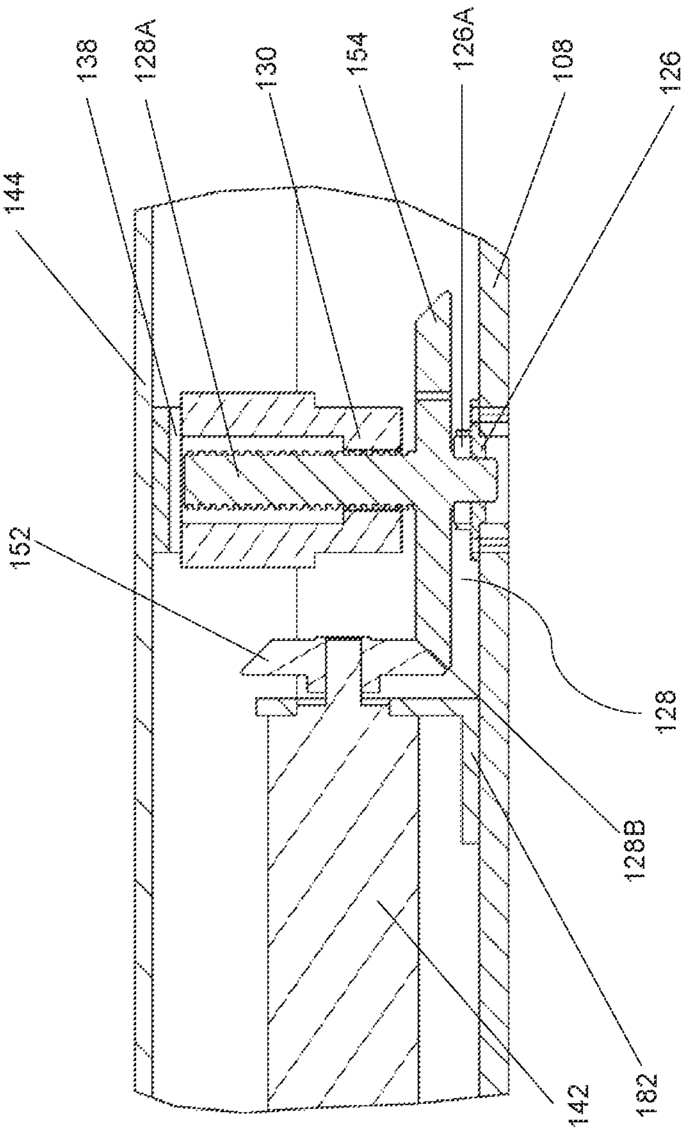
FIG. 4B depicts a detailed cross-sectional view of the ball screw and bevel gear assembly comprised in the apparatus, in accordance with an embodiment of the present disclosure.

The fork assembly 106 further a ball screw nut 130 which is assembled on the ball screw and bevel gear assembly 128. The ball screw nut 130 comprises a first end 132A and a second end 132B. The first end 132B of the ball screw nut 130 comprises a step 134 to form a plurality of threads, and a second end 132B of the ball screw nut 130 comprises a set of holes 136A-N. FIGS. 3A and 3B depict a perspective view of the ball screw nut 130 comprising the step 134 to form a plurality of threads and the set of holes 136A-N, in accordance with an embodiment of the present disclosure. The fork assembly 106 further comprises a hinge clamp 138 mounted on the second end 132B of the ball screw nut 130 via the set of holes 136A-N using a plurality of pins 140A-N. In other words, the second end 132B comprises the set of holes 136A-N on the top therein through which the plurality of short pins 140A-N are passed through to fix the hinge clamp 138 on the second end 132B of the ball screw nut 130. The components such as linear bearing 124, bearing retainer 126, ball screw and bevel gear assembly 128, ball screw 128A, bevel gear arrangement 128B, ball screw nut 130, first end of the ball screw nut 132A, second end of the ball screw nut 132B, step of the first end of the ball screw nut 134, set of holes on the second end of the ball screw nut 136A-N, hinge clamp 138, and the plurality of pins 140A-N are depicted in sectional view of the ball screw and bevel gear assembly 128 in FIGS. 4A and 4B. FIG. 4A, with reference to FIGS. 1A through 3B, depicts a detailed sectional view of the ball screw and bevel gear assembly 128 comprised in the fork assembly 106 of the apparatus 100 for AMRs/AGVs, in accordance with an embodiment of the present disclosure. FIG. 4B, with reference to FIGS. 1A through 4A, depicts a detailed cross sectional view of the ball screw and bevel gear assembly 128 comprised in the apparatus 100, in accordance with an embodiment of the present disclosure.

The fork assembly 106 further comprises a fork motor 142 fitted in the first plate 108. The fork motor 142 is operatively coupled to the ball screw and bevel gear assembly 128. More specifically, the fork motor 106 comprises a first end 156A and a second end 156B. The first end 156A of the fork motor 142 is configured to receive power supply (e.g., the first end 156A is adjacent to the third side wall 110C), and the second end 156B of the fork motor 142 is connected to the drive bevel gear 152 of the bevel gear arrangement 128B comprised in the ball screw and bevel gear assembly 128. In other words, the fork motor 142 is connected to the ball screw and bevel gear assembly 128 for enabling operations of the apparatus 100.

Figure 5:
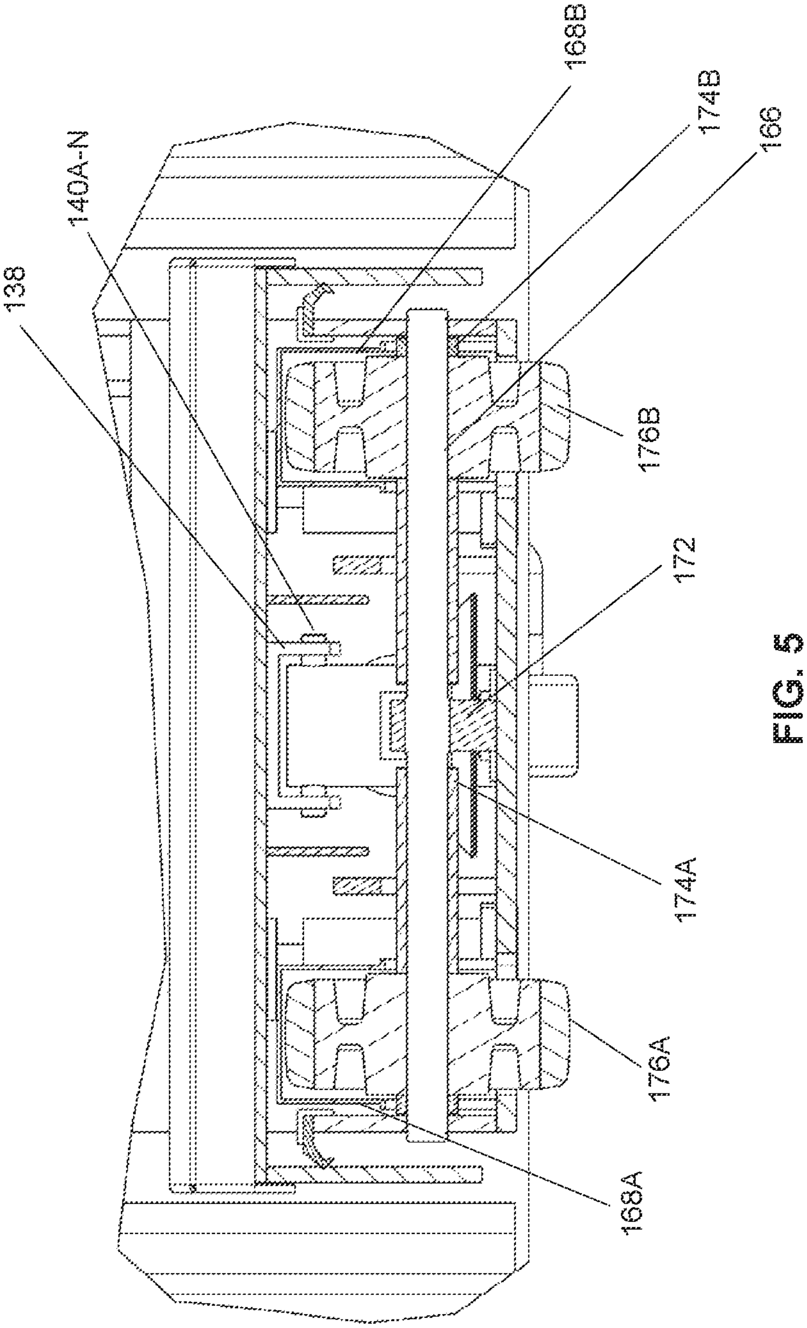
FIG. 5 depicts a front detailed sectional view of the fork assembly of the apparatus, in accordance with an embodiment of the present disclosure.
Figure 6:
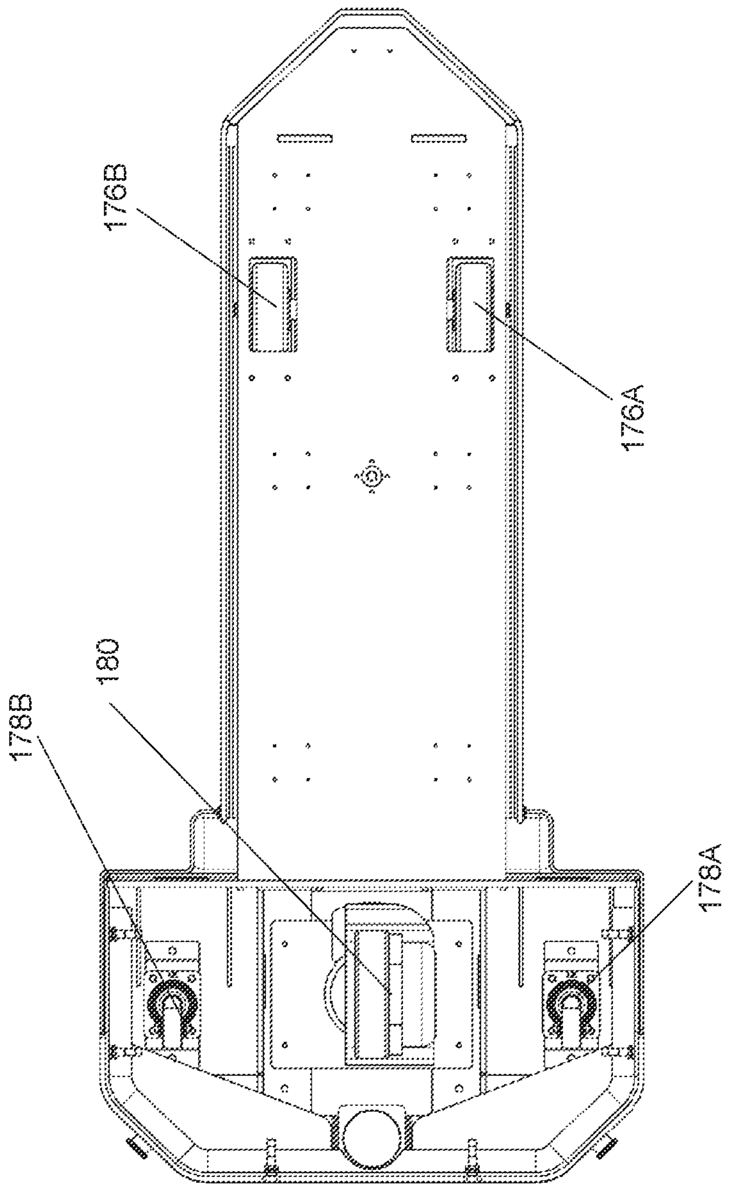
FIG. 6 illustrates a bottom view of the apparatus for AMRs/AGVs depicting one or more fork wheels, one or more swivel wheels and a drive wheel, respectively, in accordance with an embodiment of the present disclosure.
Figure 7A:
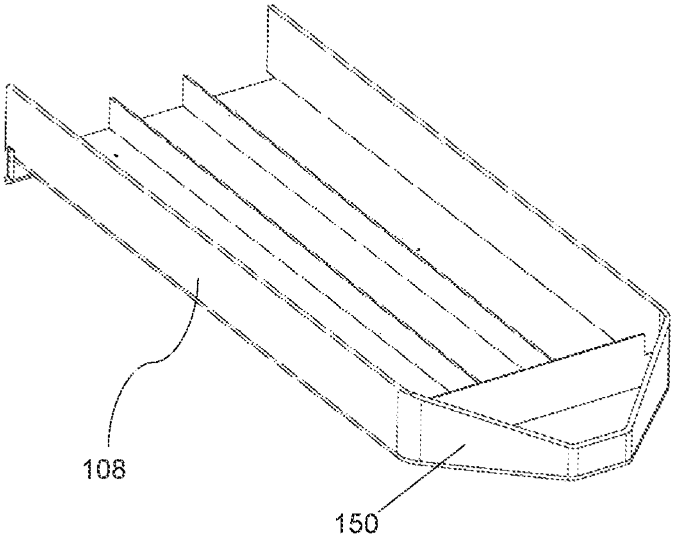
FIG. 7A depicts an inner surface of a second plate (or a top plate) of the fork assembly, in accordance with an embodiment of the present disclosure.
Figure 7B:
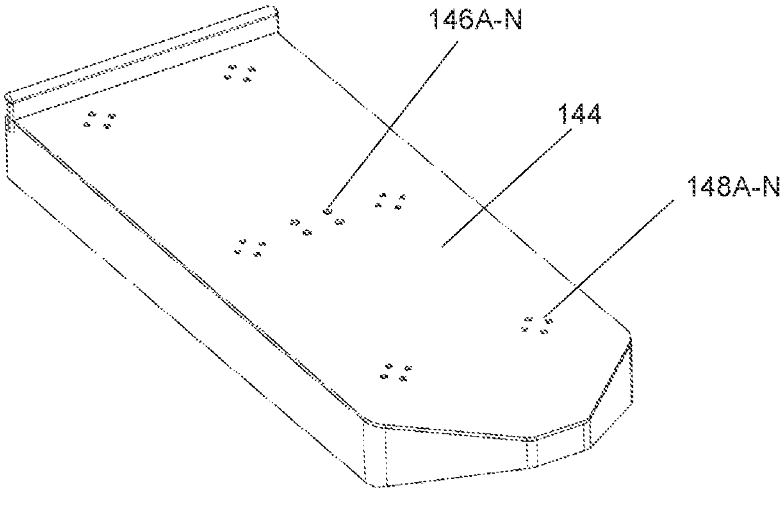
FIG. 7B depicts an outer surface of the second plate (or the top plate) of the fork assembly, in accordance with an embodiment of the present disclosure.

The fork assembly 106 further comprises a second plate 144. The second plate 144 is also referred as a top plate and may be interchangeably used herein. FIG. 7A, with reference to FIGS. 1A through 6, depicts an inner surface of the second plate 144 (or the top plate) of the fork assembly 106, in accordance with an embodiment of the present disclosure. FIG. 7B, with reference to FIGS. 1A through 7A, depicts an outer surface of the second plate 144 (or the top plate) of the fork assembly 106, in accordance with an embodiment of the present disclosure. The second plate (top plate) 144 is mounted on the first plate (bottom plate) 108. The second plate 144 comprises a plurality of hinge mounting holes 146A-N and a plurality of guide rod mounting holes 148A-N. The second plate 144 is fixed to the hinge clamp 138, the first set of guide rods 120A-C and the second set of guide rods 122A-C using a plurality of screw mechanisms through the plurality of hinge mounting holes 146A-N and the plurality of guide rod mounting holes 148A-N respectively. For instance, using a set of screw mechanisms or screws, center portion of the second plate 144 having a set of holes (e.g., 4 as depicted in FIG. 1A) is fixed or attached to the hinge clamp 138. Similarly, using another set of screw mechanism or screws the second plate (e.g., having other holes—the plurality of guide rod mounting holes 148A-N) is fixed or attached to the first set of guide rods 120A-C and the second set of guide rods 122A-C.

Each of the first plate 108 and the second plate 144 comprises a tapered guide plate 150 that extends from the second end 106B of the fork assembly 106. Tip of the tapered guide plate 150 acts as a chamfer profile which helps to reduce the risk of hitting or scratching of fork assembly during pickup of the payload.

The fork motor 142 is configured to rotate the drive bevel gear 152 in a first direction, that in turn rotates the driven bevel gear 154. Rotation of the driven bevel gear 154 drives the ball screw nut 130 and the ball screw 128A in a second direction. Driving of the ball screw nut 130 and the ball screw 128A in the second direction causes movement of the second plate 144 in the second direction.

Similarly, the fork motor 142 is further configured to rotate the drive bevel gear 152 in a third direction that in turn rotates the driven bevel gear 154. Rotation of the driven bevel gear 154 drives the ball screw nut 130 and the ball screw 128A in a fourth direction. Driving of the ball screw nut 130 and the ball screw 128A in the fourth direction causes the movement of the second plate 144 in the fourth direction. The above movement of the second plate 144 in the second and fourth direction is better understood by way of following description that shall not be construed as limiting the scope of the present disclosure.

In one instance, the fork motor 142 rotates the drive bevel gear 152 in a clockwise direction. Rotation of the drive bevel gear 152 in the clockwise direction enables rotation of the driven bevel gear 154 in the clockwise direction. Rotation of the driven bevel gear 154 drives the ball screw nut 130 and the ball screw 128A in an upward direction. This upward direction of the ball screw nut and the ball screw causes movement of the second plate 144 in the upward direction. Such working principle of the drive bevel gear 152, the driven bevel gear 154, the ball screw nut 130 and the ball screw 128A enables lifting the second plate 144 (e.g., which is movement of the second plate 144 in the upward direction).

In another instance, the fork motor 142 rotates the drive bevel gear 152 in an anti-clockwise direction. Rotation of the drive bevel gear 152 in the anti-clockwise direction enables rotation of the driven bevel gear 154 in the anti-clockwise direction. Rotation of the driven bevel gear 154 drives the ball screw nut 130 and the ball screw 128A in a downward direction. This downward direction of the ball screw nut and the ball screw causes movement of the second plate 144 in the downward direction. Such working principle of the drive bevel gear 152, the driven bevel gear 154, the ball screw nut 130 and the ball screw 128A enables lowering the second plate 144 (e.g., which is movement of the second plate 144 in the downward direction). The first direction and the second direction are a clockwise direction and an upward direction respectively. Similarly, the third direction and the fourth direction are an anti-clockwise direction and a downward direction respectively. The first direction and the second direction may be also clockwise direction and downward direction respectively and the third direction and the fourth direction may be also clockwise direction and upward direction respectively wherein such working principle is based on a threading property of the ball screw 128A and gear arrangement (e.g., drive bevel gear and driven bevel gear). For instance, a RH (right hand) threading configuration of the components of the apparatus 100 may enable rotation in a clockwise direction, and a LH (left hand) threading configuration of the components of the apparatus 100 may enable rotation in an anti-clockwise direction. The clockwise direction and/or rotation enables lifting of the second plate 144 and the anti-clockwise direction and/or rotation enables lowering the second plate 144, in example embodiment. Such working principle of the components as described herein shall not be construed as limiting the scope of the present disclosure.

Referring to FIG. 1A, the fork assembly 106 further comprises a lip seal 158. The lip seal 158 is mounted on a top surface of (i) the first side wall 110A, and (ii) the second side wall 1106, (iii) the third side wall 110C, and (iv) the fourth side wall 110D of the first plate 108. The lip seal 158 is configured to (i) refrain entry and accumulation of dust inside the first plate 108 and the second plate 144, and (ii) enable the movement of the second plate 144 with reference to the first plate 108.

The first set of bushings 112A-C, the second set of bushings 114A-C, the first set of guide rods 120A and the second set of guide rods 122A-C counter at least one of imbalance and deflection of the second plate 144 during at least one of (i) placement of a payload on the second plate, and (ii) transport of the payload from one location to another location. For instance, when a payload (e.g., a pallet, a roller cage, a roller cart, or some load) is being placed or placed on the second plate 144, there is a possibility that due to weight of the payload there may be an imbalance and/or deflection of the second plate 144. Such imbalance and deflection that is being caused or caused in the second plate 144 is adjusted to normal or countered by way of the first set of bushings 112A-C, the second set of bushings 114A-C, the first set of guide rods 120A and the second set of guide rods 122A-C. Similarly, if the payload placed on the second plate 144 is being moved from one location (e.g., say a pickup location) to another location (e.g., a drop location or desire location or destination), during the transit the payload may shift its weight on either side of the fork assembly 106 thus causing imbalance and/or deflection of the payload. Such imbalance and/or deflection is also countered by the first set of bushings 112A-C, the second set of bushings 114A-C, the first set of guide rods 120A and the second set of guide rods 122A-C.

The apparatus 100 further comprises one or more center ribs 160A-B that are configured to counter the imbalance and/or deflection that may be caused during placement or movement of the payload. The apparatus 100 further comprises a plurality of mount flanges 162A-B. Each mount flange from the plurality of mount flanges 162A-B is configured to mount one or more panels (e.g., front and rear panels) of the apparatus. The apparatus 100 further comprises one or more image/video capturing devices 192 (also referred as sensors such as image sensor(s), sensor(s), camera(s), and the like that capture image/video data of the environment in which the apparatus is deployed. The sensors may be mounted on the front of the fork assembly near the tapered guide plate 150 or at the other end of the chassis 102. The sensors are configured to help navigate and detect the payload. Once detected, the pickup operation as described above is performed by the apparatus 100. The apparatus 100 further comprises a steer and drive wheel mount bracket 164. The steer and drive wheel mount bracket 164 is configured (or fixed or coupled) with one or more steer and drive wheels 178 for driving the AMRs/AGVs via the apparatus 100. The one or more steer and drive wheels are mounted to a long pin 166 wherein the long pin 166 is mounted to the first plate 108 at two ends. Such mounting may be supported by a mounting block 172 and positioned on the first plate 108 to enable proper balancing of the apparatus 100. The steer and drive wheels are easy to insert over the long pin 166 and may be further locked with one or more spacers 174A-B and/or circlips (not shown in FIGS.) as known in the art. FIG. 5, with reference to FIGS. 1A through 4B, depicts a front detailed sectional view of the fork assembly of the apparatus 100, in accordance with an embodiment of the present disclosure. The steer and drive wheel mount bracket 164 act as an enclosure for the steer and drive wheels to refrain from entry and accumulation of dust.

The apparatus 100 further comprises one or more fork wheels 176A-B at the bottom surface of the first plate 108. The one or more fork wheels 176A-B are configured for enabling navigation of the apparatus 100 when integrated with AMRs/AGVs to increase the stability therebetween. The one or more fork wheels may be mounted (or attached or coupled) to one or more wheel mount brackets 168A-B of the first plate 108 as depicted in FIG. 1. The apparatus 100 further comprises one or more swivel wheels 178A-B and a drive wheel 180 at the other end (e.g., front end of the chassis). A motor may be configured or operatively coupled to the one or more fork wheel(s), the drive wheel(s), the one or more swivel wheels accordingly and these may be driven for operation/navigation and rotation. The one or more swivel wheels 178A-B may be mounted on one or more swivel wheel mount brackets 196A-B. The same fork motor 142 may also be configured to provide power supply to wheels (e.g., the drive wheel(s), the swivel wheel(s), the fork wheel(s)) for navigation and operation of the apparatus 100).

The apparatus 100 further comprises one or more ultrasonic sensors 194A-N. The ultrasonic sensors 194A-N are used as proximity sensors in autonomous mobile robots which increases the safety of an autonomous mobile robots during navigation, wherein the proximity sensors are configured to detect humans, and/or other objects. The apparatus 100 further comprises LiDAR sensor(s) 196. The LiDAR sensor(s) 196 serve as safety sensors that transmit signal(s) in the environment in which the AMR are operated. Response to transmitted signal is received by the AMR which helps determining the proximity/position of a surrounding object(s)/human(s). This response which is indicative of the proximity/position of the surround object(s)/human(s) enables the AMRs to do course correction of the path during the navigation/movement. FIG. 6, with reference to FIGS. 1A through 5, illustrates a bottom view of the apparatus 100 for AMRs/AGVs depicting the one or more fork wheels 176A-B, the one or more swivel wheels 178A-B, and the drive wheel 180, respectively, in accordance with an embodiment of the present disclosure. The fork motor 142 may be supported by way of a fork motor mounting bracket 182 (refer FIG. 4B). Similarly, it is to be understood by a person having ordinary skill in the art or person skilled in the art that such arrangement shall not be construed as limiting the scope of the present disclosure. With these set of drive and swivel wheels, the apparatus 100 when integrated with AMRs/AGVs can move in either direction (e.g., forward, backward, sidewise, curved path, and the like). The drive wheels also provide traction to the apparatus 100 and AMRs/AGVs, in an embodiment of the present disclosure. Such functionalities of the swivel wheels can be realized as known in the art. In addition to the above functionalities, each swivel wheel from the plurality of swivel wheels is further configured to enable forward and backward movement in a smooth manner. The apparatus 100 further comprises a battery mounting plate 170. The battery mounting plate 170 is configured to house/accommodate one or more batteries 170A. The one or more batteries are configured to provide/supply power to one or more components of the apparatus 100 and AMRs/AGVs as known in the art for navigation and other operations for placement and movement of the payload. In another embodiment, the components of the apparatus 100 and AMRs/AGVs may also be operated from mains supply via a wire/cable and plug mechanism attached (or electrically coupled/connected) therebetween. Such power supply means by way of either batteries and/or mains supply shall not be construed as limiting the scope of the present disclosure.

The apparatus 100 further comprises one or more chassis gussets 182A-B as shown in FIG. 1C. The chassis gussets are welded (or positioned) in between the functional plates (e.g., battery mounting plate 170 or the steer and drive wheel mount bracket 164) and support plates to strengthen the chassis structure. The support plate (not referenced any numeral) is vertically positioned between the chassis 102 and the fork assembly 106.

Figure 8A:
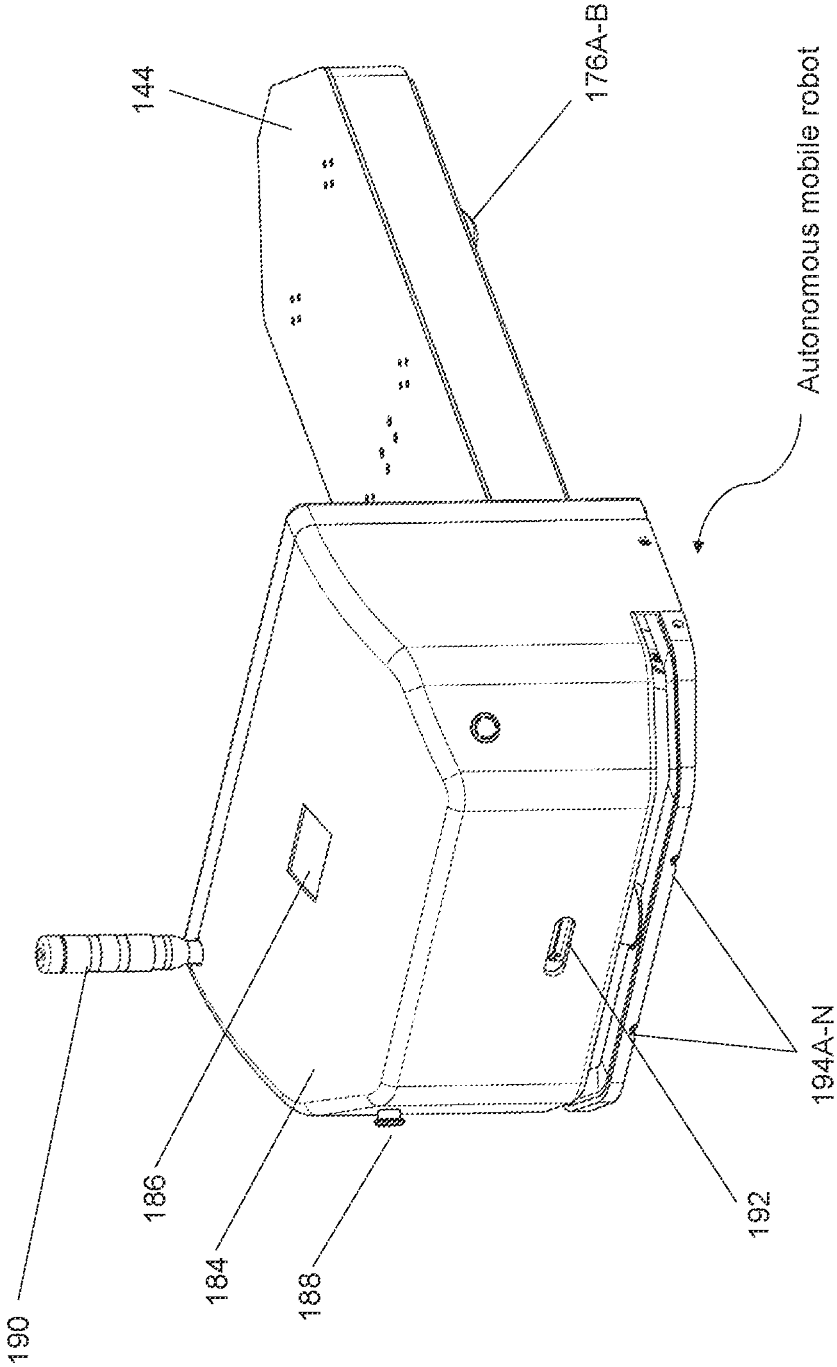
FIG. 8A depicts a rear view and a use case scenario of the apparatus forming a part of (or connected to) the autonomous mobile robot (AMR), in accordance with an embodiment of the present disclosure.
Figure 8B:
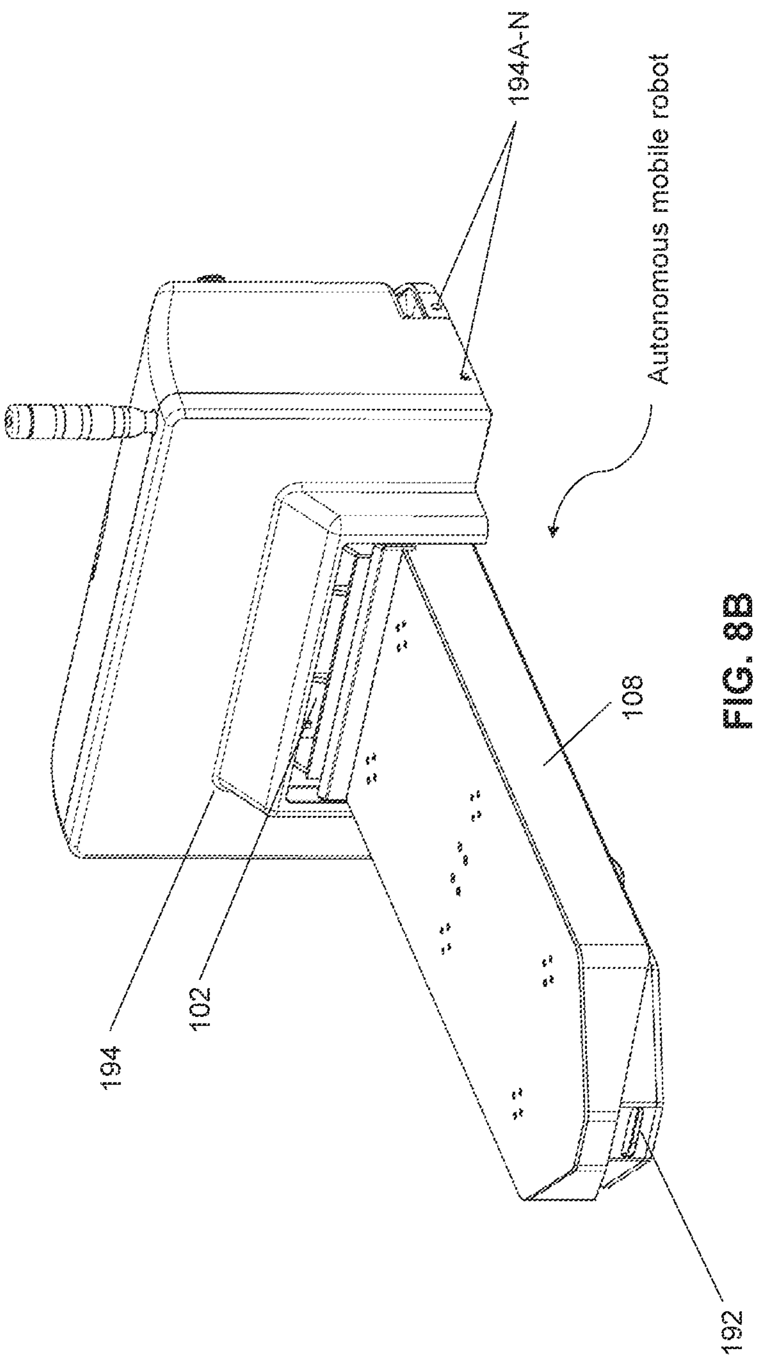
FIG. 8B depicts a front view and a use case scenario of the apparatus 100 forming a part of (or connected to) the autonomous mobile robot (AMR), in accordance with an embodiment of the present disclosure.
Figure 8C:
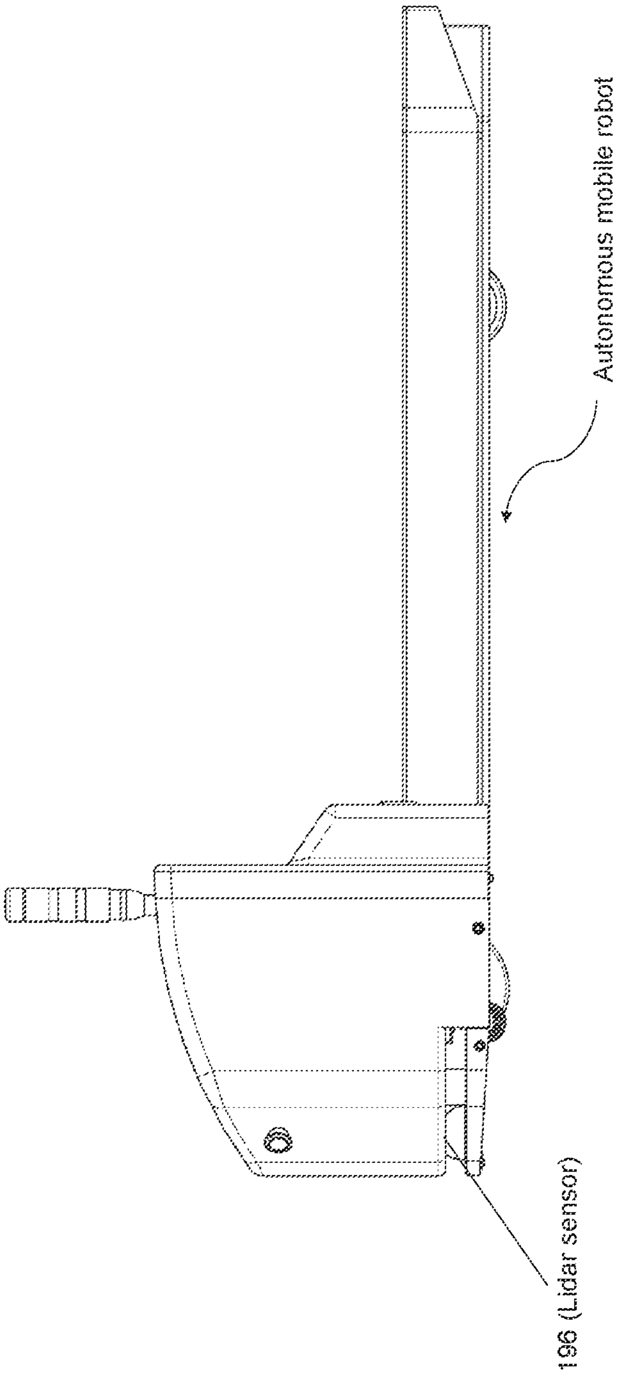
FIG. 8C depicts a side view and a use case scenario of the apparatus 100 forming a part of (or connected to) the autonomous mobile robot (AMR), in accordance with an embodiment of the present disclosure.
Figure 8D:
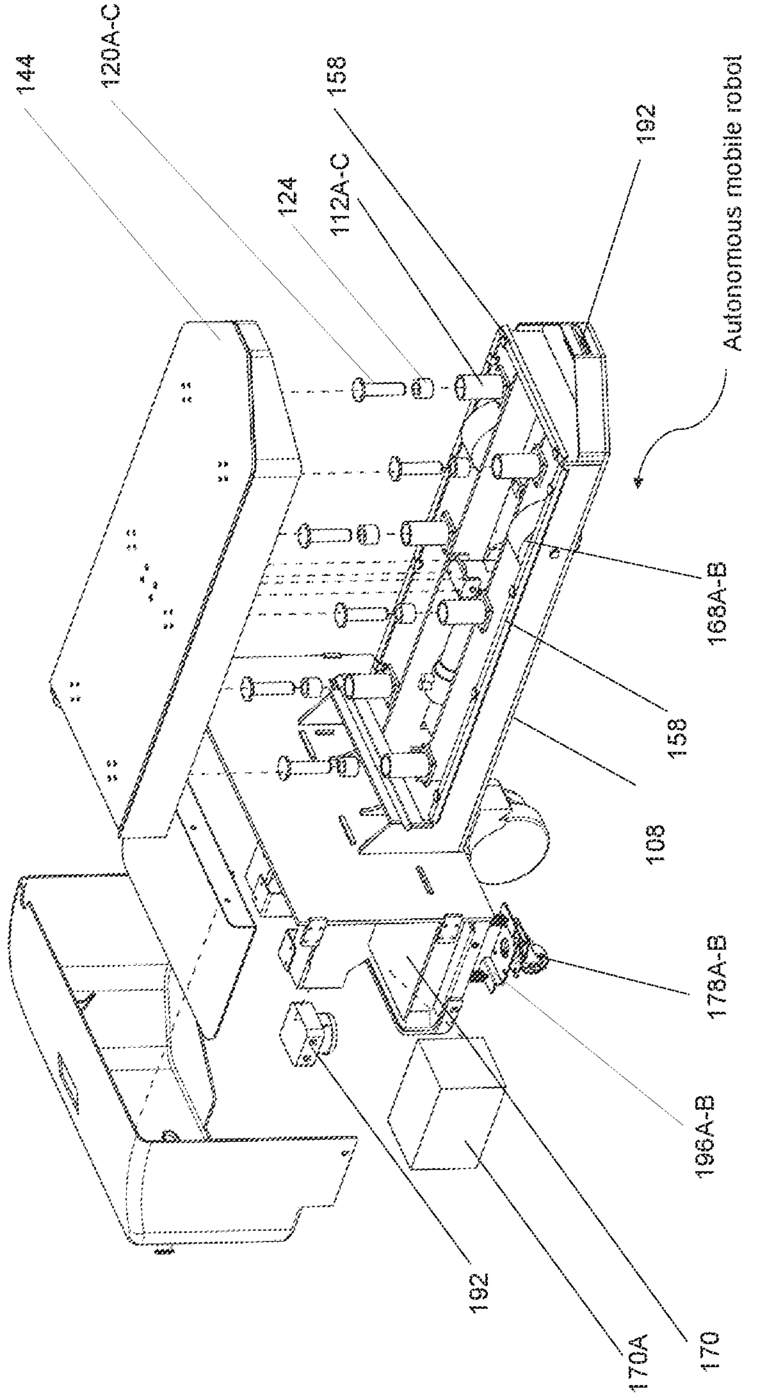
FIG. 8D depicts a perspective exploded view illustrating integral components of the apparatus and a use case scenario of the apparatus forming a part of (or connected to) the autonomous mobile robot (AMR) with corresponding integral components, in accordance with an embodiment of the present disclosure.

As described above, the apparatus 100 may form an attachable component or a fixable component to an autonomous mobile robot (AMR) or an autonomous guided vehicle (AGV) via one or more fixing components/means (e.g., either via hardware components such as clamps, or coupled via electrical buses/cables through appropriate interfaces as known in the art. FIGS. 8A through 8D, depict a use case scenario of the apparatus 100 forming a part of (or connected to) the autonomous mobile robot (AMR), in accordance with an embodiment of the present disclosure. More specifically, FIG. 8A, with reference to FIGS. 1A through 7B, depicts a rear view and a use case scenario of the apparatus 100 forming a part of (or connected to) the autonomous mobile robot (AMR), in accordance with an embodiment of the present disclosure. FIG. 8B, with reference to FIGS. 1A through 8A, depicts a front view and a use case scenario of the apparatus 100 forming a part of (or connected to) the autonomous mobile robot (AMR), in accordance with an embodiment of the present disclosure. FIG. 8C, with reference to FIGS. 1A through 8B, depicts a side view and a use case scenario of the apparatus 100 forming a part of (or connected to) the autonomous mobile robot (AMR), in accordance with an embodiment of the present disclosure. FIG. 8D, with reference to FIGS. 1A through 8C, depicts a perspective exploded view illustrating integral components of the apparatus 100 and a use case scenario of the apparatus 100 forming a part of (or connected to) the autonomous mobile robot (AMR) with corresponding integral components, in accordance with an embodiment of the present disclosure. The apparatus 100 when integrated to or operatively connected/coupled to the AMR (or AGV) may be equipped with other components such as a front panel 184 that covers the integral components of the chassis 102. The AMR further comprises a display 186 to display information pertaining to the apparatus 100, the AMR/AGV, placement/movement of the payload, and operation or operating procedures of the apparatus 100 and the AMR/AGV, and the like. An emergency button 188 is also incorporated in the AMR/AGV to bring the apparatus 100 or the AMR/AGV to halt or stop from operating/functionality in case of anomalies, or inadvertent operations being performed (e.g., during placement and movement of the payload, navigation of the AMR/AGV, and the like). The AMR/AGV further comprises a light indicator 190 that indicates one or more states of the apparatus 100 and/or the AMR/AGV via one or more light modes (e.g., green for working normal, red for malfunctioning of one or more components of the apparatus/AMR/AGV, and/or any other appropriate color modes to indicate a communication message that is specific to an operating mode or working of the apparatus 100/AMR/AGV). As mentioned above, the cameras 192 are also incorporated to capture image/video data of the surrounding/environment during payload placement and movement/navigation. The cameras 192 may be placed anywhere such as integral to the apparatus at the end of the tapered guide plate 150 or at the other side of the chassis 102 as shown in FIG. 8A. The cameras 192 may also be referred as front camera, rear camera, side cameras, top cameras, bottom cameras, and the like and positioned accordingly. The AMR/AGV further comprises a rear panel 194 that is configured to cover the first end of the fork assembly 106A. In other words, the rear panel 194 may serve as a protective gear/protective cover element for the first end of the fork assembly 106A.

The apparatus 100 may be operated based on instructions set comprised in a system (e.g., the system is either within the apparatus 100 or externally connected to the system 100 via I/O communication interfaces). For executing the instructions set(s) as mentioned above, the apparatus 100 may comprise (or comprises) the system (not shown in FIGS) that includes a memory for storing the instructions set(s), one or more input/output communication interfaces interface(s), one or more hardware processors. The one or more hardware processors are communicatively coupled to the memory via the one or more communication interfaces wherein the one or more hardware processors are configured by the instructions to execute and enable operation of each component of the apparatus 100 as described herein. More specifically, the movement of the apparatus 100, the fork assembly 106 operation and the working of the other components comprised in the apparatus 100 as described above may be based on instructions set being executed by the one or more hardware processors for handling payload (either placed on the fork assembly or to be placed or to be moved from one location to another location). Various components of the apparatus 100 are (or may be) configured by the instructions set to perform the method described herein for handling the payload. The system may be mounted on the apparatus 100, in one example embodiment of the present disclosure. The system may be housed on the apparatus 100, in another example embodiment of the present disclosure. The system may be comprised in the apparatus 100, in yet another example embodiment of the present disclosure. The system may be communicatively coupled to the apparatus 100 via one or more communication interfaces as applicable and known in the art, in yet further example embodiment of the present disclosure. In such scenarios where it is communicatively coupled (or connected) to the apparatus 100, the apparatus 100 may be provisioned with options and configured with suitable arrangement such that the apparatus 100 can be operated via the connected/communicatively coupled system. The apparatus 100 may be used and/or implemented in AMRs/AGVs for roller carts lifting, vertical rack in a goods to picker setup and the like. Other applications include but are not limited to warehouse and logistics environments, distribution centers where pallets and/or roller carts/cages are to be picked and placed from one location to another location.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is intended that the disclosure and examples be considered as exemplary only, with a true scope of disclosed embodiments being indicated by the following claims.

What is claimed is:

1. An apparatus comprising:

a chassis comprising a front end and a rear end, wherein the rear end of the chassis serves as a fork assembly, wherein the fork assembly comprises a first end and a second end, and wherein the fork assembly further comprises:

a first plate comprising a first side wall and a second side wall, wherein each of the first side wall and the second side wall extends from the first end through the second end of the fork assembly;

a first set of bushings and a second set of bushings, wherein each bushing from the first set of bushings and the second set of bushings comprises a circular end and a flange end, wherein the flange end of each bushing from the first set of bushings and the second set of bushings comprises a plurality of holes, and wherein the first set of bushings and the second set of bushings are mounted adjacent to the first side wall and the second side wall respectively on the first plate of the fork assembly by a plurality of screws that are fitted into the plurality of holes of the flange end;

a first set of guide rods and a second set of guide rods, wherein each guide rod from the first set of guide rods and the second set of guide rods is configured to slide through the circular end and a corresponding linear bearing comprised in a corresponding bushing from the first set of bushings and the second set of bushings;

a bearing retainer mounted on the first plate;

a ball screw and bevel gear assembly coupled to the bearing retainer using one or more bearings, wherein the ball screw and bevel gear assembly comprises a ball screw and a bevel gear arrangement;

a ball screw nut mounted on the ball screw and bevel gear assembly, wherein a first end of the ball screw nut comprises a step to form a plurality of threads, and a second end of the ball screw nut comprises a set of holes;

a hinge clamp mounted on the second end of the ball screw nut via the set of holes using a plurality of pins;

a fork motor fitted in the first plate, wherein the fork motor is operatively coupled to the ball screw and bevel gear assembly; and a second plate mounted on the first plate, wherein the second plate comprises a plurality of hinge mounting holes and a plurality of guide rod mounting holes, wherein the second plate is fixed to the hinge clamp, the first set of guide rods and the second set of guide rods using a plurality of screw mechanisms through the plurality of hinge mounting holes and the plurality of guide rod mounting holes respectively.

2. The apparatus as claimed in claim 1, wherein each of the first plate and the second plate comprises a tapered guide plate that extends from the second end of the fork assembly.

3. The apparatus as claimed in claim 1, wherein the bevel gear arrangement comprises a drive bevel gear and a driven bevel gear, and wherein the drive bevel gear and the driven bevel gear are operatively coupled to each other.

4. The apparatus as claimed in claim 3, wherein the fork motor comprises a first end and a second end, and wherein the first end of the fork motor is configured to receive power supply, and the second end of the fork motor is connected to the drive bevel gear of the bevel gear arrangement.

5. The apparatus as claimed in claim 4, wherein the fork motor is configured to rotate the drive bevel gear in a first direction that in turn rotates the driven bevel gear, wherein rotation of the driven bevel gear drives the ball screw and the ball screw nut in a second direction, and wherein driving of the ball screw and the ball screw nut in the second direction causes movement of the second plate in the second direction.

6. The apparatus as claimed in claim 5, wherein the fork motor is further configured to rotate the drive bevel gear in a third direction that in turn rotates the driven bevel gear, wherein rotation of the driven bevel gear drives the ball screw and the ball screw nut in a fourth direction, and wherein driving of the ball screw and the ball screw nut in the fourth direction causes the movement of the second plate in the fourth direction.

7. The apparatus as claimed in claim 6, comprising a lip seal mounted on a top surface of (i) the first side wall, and (ii) the second side wall, (iii) a third side wall, and (iv) a fourth side wall of the first plate, wherein the lip seal is configured to (i) refrain entry and accumulation of dust inside the first plate and the second plate, and (ii) enable the movement of the second plate with reference to the first plate.

8. The apparatus as claimed in claim 7, wherein the bearing retainer and the ball screw and bevel gear assembly are placed and mounted at a center of a region formed by the first side wall, the second side wall, the third side wall, and the fourth side wall of the first plate and between the first plate and the second plate such that the bearing retainer and the ball screw and bevel gear assembly are equidistant from the first end and the second end of the fork assembly.

9. The apparatus as claimed in claim 5, wherein the first direction and the second direction are a clockwise direction and an upward direction respectively.

10. The apparatus as claimed in claim 6, wherein the third direction and the fourth direction are an anti-clockwise direction and a downward direction respectively.

11. The apparatus as claimed in claim 1, wherein the first set of bushings, the second set of bushings, the first set of guide rods, and the second set of guide rods are configured to counter at least one of imbalance and deflection of the second plate during at least one of (i) placement of a payload on the second plate, and (ii) transport of the payload from one location to another location.

12. The apparatus as claimed in claim 1, wherein each bushing from the first set of bushings and the second set of bushings is mounted at a specific position on the first plate such that each bushing and an adjacent bushing are separated by a pre-defined distance.

* * * * *